June 13, 1950 C. HOLLERITH 2,511,264
WHEEL STRUCTURE
Filed April 15, 1947 2 Sheets-Sheet 1
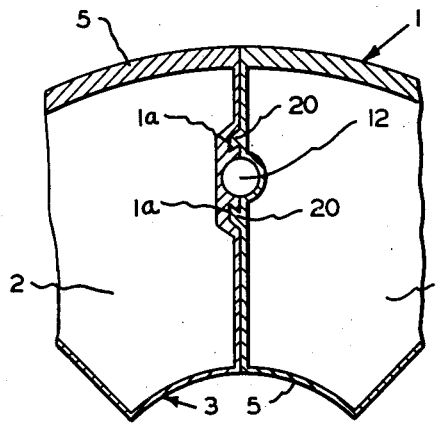
FIG. I.
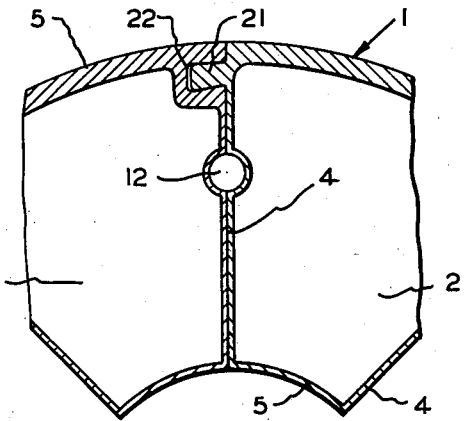
FIG. II.
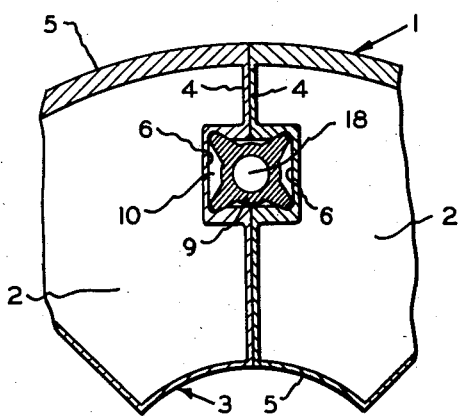
FIG. III.
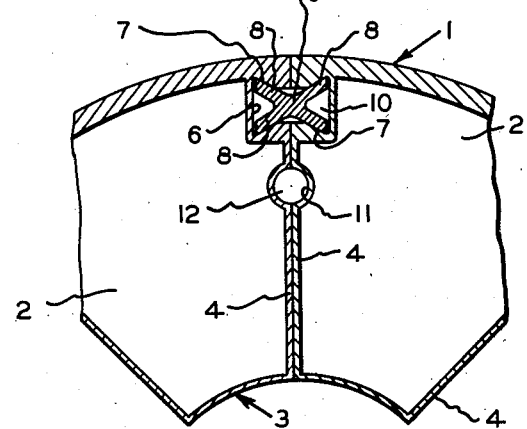
FIG. IV.
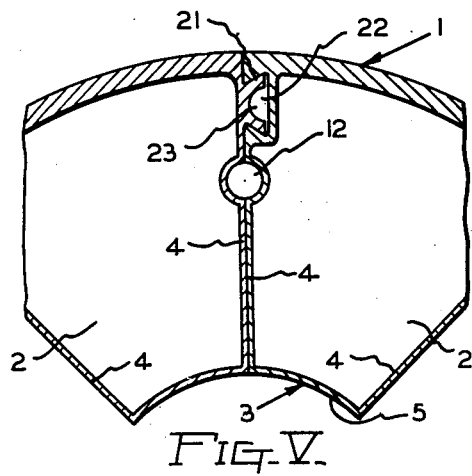
FIG. V.
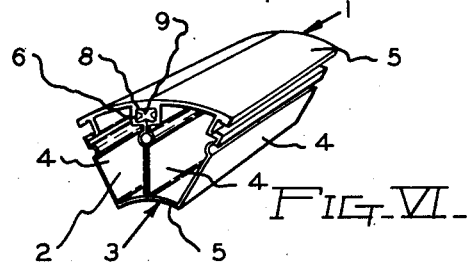
FIG. VI.
Inventor
CHARLES HOLLERITH
By Beaman & Patch
Attorneys

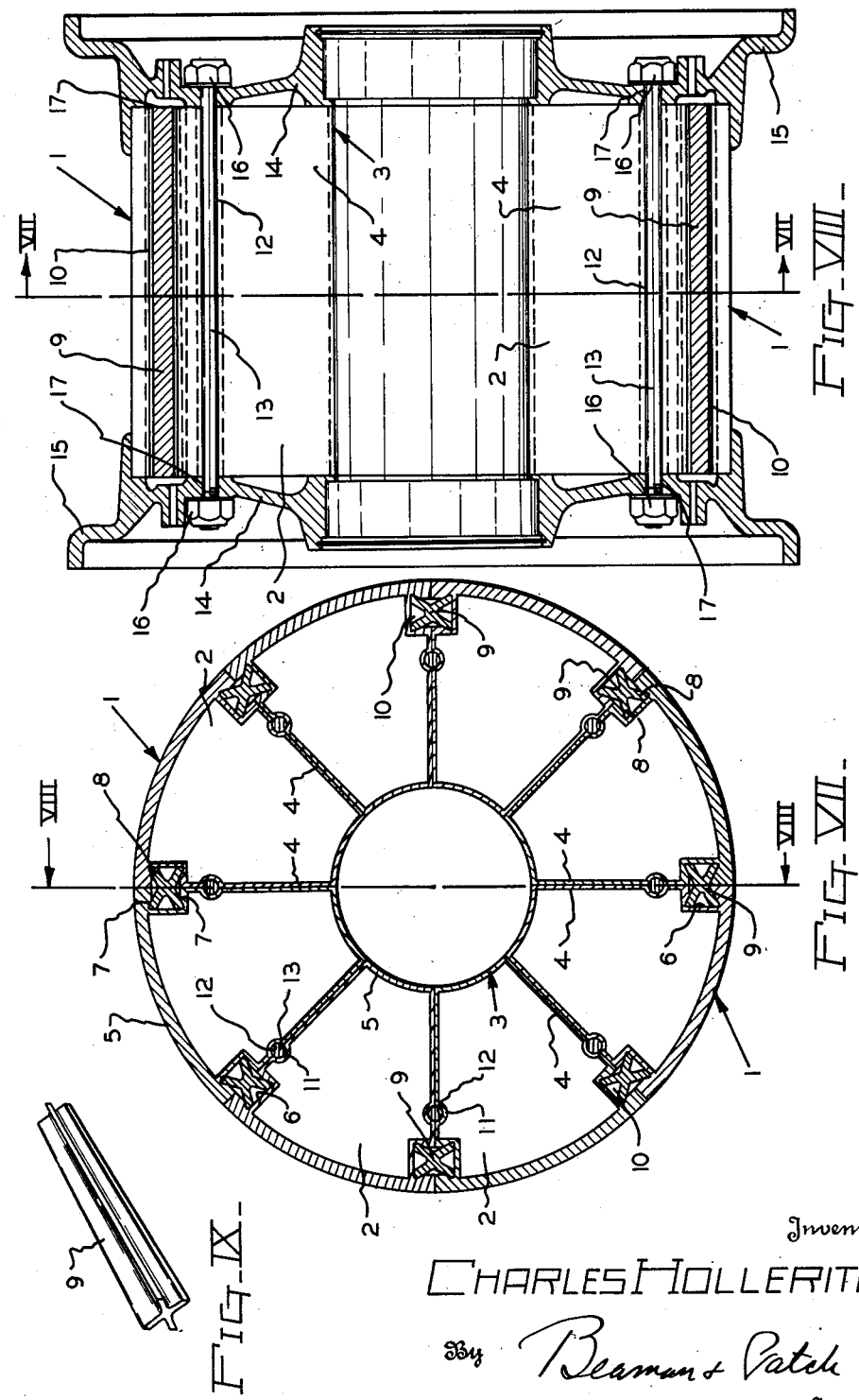

Patented June 13, 1950

2,511,264

UNITED STATES PATENT OFFICE 2,511,264

WHEEL STRUCTURE

Charles Hollerith, Jackson, Mich., assignor, by mesne assignments, to The B. F. Goodrich Company, Akron, Ohio, a corporation of New York Application April 15, 1947, Serial No. 741,597

2 Claims. (Cl. 301—62)

This invention relates to wheel constructions and particularly to such as are used on aircraft.

The invention has for its object to provide an improved wheel construction which while of light weight, is also of robust construction and can be readily manufactured and assembled from pre-fabricated standardized parts or sections.

These and other objects and advantages residing in the construction, arrangement and combination of the several parts constituting the wheel construction will be apparent from a consideration of the following description and claims.

In the drawings,

Figs. I to V are fragmentary cross-sectional views showing different ways in which the circumferentially adjacent hollow extrusions or cells of the cylindrical body part of a wheel construction in accordance with the invention may be connected together, Fig. VI is a perspective view, on a reduced scale, showing two circumferentially adjacent hollow extrusions or cells connected together in the desired relationship by means of a separate locking bar, Fig. VII is a cross section on the line VII—VII of Fig. VIII showing a complete assembly of hollow extrusions or cells held secured together by separate locking bars to complete the central cylindrical body part of the wheel structure, Fig. VIII is a longitudinal section on the line VIII—VIII of Fig. VII with the central body part shown associated with the end wheel castings to form a complete wheel construction, and Fig. IX is a perspective view of a locking bar as employed in the wheel construction according to Figs. VII and VIII.

Referring to the drawings and first to Figs. IV, VI, VII, VIII and IX a wheel construction is shown comprising a central cylindrical body part, indicated generally at 1, which serves to form the base of the wheel rim and which is built up from a plurality of similar hollow extrusions 2 assembled together in circumferentially adjacent relationship, as shown particularly in Fig. VII, to form a cellular body which provides a central hollow hub, indicated generally at 3, and an outer concentric cylindrical wall 1, which, as stated forms the base of the wheel rim.

Each hollow metal extrusion or cell extends longitudinally of the cylindrical body part and is of sector shape in cross section, having two opposite radial walls 4 and two concentric part-cylindrical walls 5, which latter in the assembled condition of the cells combine to complete the inner and outer cylindrical walls 1 and 3 of the central body part and the inner of which cylindrical walls combine to form the hollow wheel hub 3.

The hollow extrusions are assembled together with their adjacent radial walls in opposed and abutting relationship and they are held together in such relationship by the employment of any suitable and convenient securing means.

In the constructions shown in the drawings the opposed radial walls of the extruded hollow sections are formed to receive separate securing bolts or locking bars and/or are formed to have inter-locking engagement with each other.

According to Figs. IV, VI, VII, VIII and IX the radial walls of the extruded hollow sections are each formed near their outer extremities with a longitudinally extending channel 6, the corners of which are recessed inwardly, as indicated at 7, to receive the extremities of the arms of a separate locking bar 9 of cross-shape section, which bar is capable of being slid endwise into the enclosed longitudinal space 10 formed between each opposed pair of such longitudinal channels 6 when the extruded sections 2 are assembled together in the desired relationship to form the wheel body part. The radial walls of the extruded sections containing said channels 6 are also formed with other and semi-cylindrical channels 11 which, on the opposed radial walls, combine to form cylindrical channels 12 through which longitudinally extending securing bolts 13 may be passed to serve the purpose of securing the separately formed wheel sides 14 to the opposite ends of the central wheel body 1, as shown in Fig. VIII. These wheel sides 14 may be formed as castings and carry the tire retaining flanges 15 and the wheel sides are secured in position by means of nuts 16 screwed onto the screw-threaded extremities of the through bolts 13, which extremities extend through openings 17 in the said wheel sides.

In Fig. 3 a modified arrangement of the securing means is shown, according to which the cross-section locking bar 9 is formed with a central longitudinal bore 18 which serves to receive a through bolt 13 and thereby obviates the necessity of providing the separate longitudinal cylindrical channels 12.

Instead, however, of employing separately formed locking bars the required inter-connection of the adjacent body sections 2 can be effected by the relative inter-engagement of longitudinally extending tongues and grooves on the respective and opposd radial walls of the body sections. Arrangements modified for this purpose are illustrated in Figs. I, II and V.

In Fig. I, the radial wall 4 of a hollow body section 2 is formed with radially spaced longitudinal and parallel grooves 19 which are inclined depthwise in opposite directions and serve to receive therein correspondingly inclined tongues 20 provided upon the radial wall of the other hollow body section so as to extend longitudinally and in parallel relationship along this wall. The two sections can be connected together, by the inter-engagement of these tongues and grooves when the two sections are slid together axially. In this construction also, the opposed radial walls of the body sections 2 are formed with complementary channels which combine to form a cylindrical channel 12 in which a through bolt 13 may be accommodated. This channel 12, in this instance, is centrally disposed between the inter-engaging tongues and grooves so as to extend parallel with the latter.

In Fig. II, the required connection of the adjacent body sections 2 is achieved by providing the opposed radial wall of one section with an outwardly projecting longitudinal tongue 21 which is of taper formation and is widest at its outer end, whereby the tongue fits with a wedge action into a corresponding shaped longitudinal groove 22 formed in the opposed radial wall of the other body section and resists lateral separation of the two sections while permitting the same to be readily assembled or disconnected by sliding the two sections axially relatively to each other. A similar arrangement is shown in Fig. V wherein, however, the outwardly tapered tongues 21 are hollowed out, as indicated at 23, along their outer longitudinal edges and in both arrangements, as shown in Figs. II and V, the opposed and radial walls of the body sections 2 are formed with complementary semi-cylindrical channels which combine to form longitudinally extending cylindrical channels 12 for the passage of through bolts 13 by which the central body part 1 and the end wheel parts 14 can be united to form the complete structure.

The wheel sides 14 are shown formed with circumferential flanges or bead seats, which overlap the outside of the central cellular body part at the opposite end portions thereof and thereby, in the assembled condition of the wheel parts, serve to maintain the sections of the central wheel body part against outward displacement. Accordingly, those sections might be held in position simply by relying upon the presence of these bead seats and the tie bolts 13 and the employment of the separate locking bars and/or interlocking connection between the opposed radial walls of the adjacent sections 2 could be dispensed with.

Having thus described my invention, what I claim as new and desire to cover by Letters Patent is:

1. A landing wheel for use with a pneumatic tire on aircraft, said wheel comprising a series of hollow open-ended complementary sector blocks providing in assembled relation a hub and a rim seat thereabout spaced radially outward therefrom, said sector blocks being of uniform cross section throughout their extent axially of the wheel and each having radial walls abutting against the walls of the adjoining sectors, said walls also providing mating dovetail grooves for receiving locking keys and mating bolt grooves for clearing axially disposed bolts, locking keys in said dovetail grooves, a pair of end plates each having an axial flange extending over the assembled sector blocks and also having a radial tire retaining flange, and bolts extending through said end plates and along said bolt grooves for holding the parts in assembled relation.

2. A landing wheel for use with a pneumatic tire on aircraft, said wheel comprising a series of hollow open-ended complementary sector blocks providing in assembled relation a hub and a rim seat thereabout spaced radially outward therefrom, said sector blocks being of uniform cross section throughout their extent axially of the wheel and each having radial walls for abutting against the walls of the adjoining sectors, said abutting walls having complementary grooves defining two series of radially spaced axial channels open to the opposite ends of the assembled blocks, locking keys in one series of channels adapted to hold the blocks in said abutting relationship, a pair of end plates of disc formation, said end plates having axial flanges slidably engaged over the opposite end portions of said block assembly and also having tire retaining flanges, and axial tie means engaged with said end plates and extending through the other series of said channels, said tie means securing the end plates and the block assembly together and holding them against axial separation.

CHARLES HOLLERITH.

REFERENCES CITED

The following references are of record in the file of this patent:

UNITED STATES PATENTS

| Number | Name | Date |
|---|---|---|
| 214,454 | Righter | Apr. 15, 1879 |
| 350,918 | Deming | Oct. 19, 1886 |
| 419,556 | Reeves | Jan. 14, 1890 |
| 429,116 | Cowles | June 3, 1890 |
| 749,756 | Stroba | Jan. 19, 1904 |
| 1,171,225 | Michaud | Feb. 8, 1916 |
| 1,737,935 | Meldrum | Dec. 3, 1929 |
| 1,742,965 | Meldrum | Jan. 7, 1930 |

FOREIGN PATENTS

| Number | Country | Date |
|---|---|---|
| 1,760 | Great Britain | 1913 |